US011900417B2

(12) United States Patent
Singh et al.

(10) Patent No.: US 11,900,417 B2
(45) Date of Patent: Feb. 13, 2024

(54) PERSONALIZED PRODUCT SERVICE

(71) Applicant: Catalina Marketing Corporation, St. Petersburg, FL (US)

(72) Inventors: Zubin Singh, St. Petersburg, FL (US); Todd Schramek, St. Petersburg, FL (US); Ryan Monahan, St. Petersburg, FL (US); Ron Menich, Atlanta, GA (US); Kirk Dikun, Tampa, FL (US); Eugene Kamarchik, Atlanta, GA (US)

(73) Assignee: Catalina Marketing Corporation, St. Petersburg, FL (US)

( * ) Notice: Subject to any disclaimer, the term of this patent is extended or adjusted under 35 U.S.C. 154(b) by 0 days.

(21) Appl. No.: 17/717,576

(22) Filed: Apr. 11, 2022

(65) Prior Publication Data

US 2022/0292544 A1    Sep. 15, 2022

Related U.S. Application Data

(62) Division of application No. 17/098,142, filed on Nov. 13, 2020, now Pat. No. 11,301,899.
(Continued)

(51) Int. Cl.
*G06Q 30/00* (2023.01)
*G06Q 30/0251* (2023.01)
(Continued)

(52) U.S. Cl.
CPC ......... *G06Q 30/0255* (2013.01); *G06F 9/547* (2013.01); *G06F 16/219* (2019.01);
(Continued)

(58) Field of Classification Search
None
See application file for complete search history.

(56) References Cited

U.S. PATENT DOCUMENTS 6,292,786 B1 * 9/2001 Deaton ............. G06Q 30/0236
                                                    705/16
2003/0144907 A1 * 7/2003 Cohen, Jr. .......... G06Q 30/0269
                                                    705/14.66
(Continued)

FOREIGN PATENT DOCUMENTS

JP    2017199438 A    11/2017
JP    2018169646 A    11/2018

OTHER PUBLICATIONS

International Search Report and Written Opinion dated Mar. 5, 2021 in International Application No. PCT/US2020/060486.
(Continued)

*Primary Examiner* — Luis A Brown
(74) *Attorney, Agent, or Firm* — McDermott Will & Emery LLP

(57) ABSTRACT

A method is provided that includes receiving, in a server, a request from a service provider, the request including a consumer identification code associated with a consumer, and obtaining a personalized list of universal product codes based on the consumer identification code and a purchase history log in a database. The method also includes providing the personalized list of universal product codes to the service provider, and receiving a tracking pixel indicative that the consumer has interacted with a consumer payload, wherein the consumer payload is associated with at least one product from the personalized list of universal product codes. A system and a non-transitory, computer-readable medium storing instructions which cause the system to perform the above method are also disclosed.

20 Claims, 9 Drawing Sheets

Related U.S. Application Data

(60) Provisional application No. 62/936,314, filed on Nov. 15, 2019.

(51) Int. Cl.

| | | |
|---|---|---|
| *G06N 20/00* | (2019.01) | |
| *G06Q 30/0201* | (2023.01) | |
| *G06Q 30/0241* | (2023.01) | |
| *G06Q 30/0272* | (2023.01) | |
| *G06Q 30/0204* | (2023.01) | |
| *G06F 16/21* | (2019.01) | |
| *G06F 9/54* | (2006.01) | |
| *G06F 16/9537* | (2019.01) | |
| *G06F 16/2457* | (2019.01) | |
| *G06F 16/9535* | (2019.01) | |
| *G06Q 10/087* | (2023.01) | |

(52) U.S. Cl.
CPC .... *G06F 16/24578* (2019.01); *G06F 16/9535* (2019.01); *G06F 16/9537* (2019.01); *G06N 20/00* (2019.01); *G06Q 10/087* (2013.01); *G06Q 30/0201* (2013.01); *G06Q 30/0205* (2013.01); *G06Q 30/0259* (2013.01); *G06Q 30/0261* (2013.01); *G06Q 30/0269* (2013.01); *G06Q 30/0272* (2013.01); *G06Q 30/0276* (2013.01)

(56) References Cited

U.S. PATENT DOCUMENTS

| | | | |
|---|---|---|---|
| 2007/0038516 A1* | 2/2007 | Apple | G06Q 30/02 705/14.42 |
| 2007/0162337 A1* | 7/2007 | Hawkins | G06Q 30/0235 705/14.27 |
| 2008/0010114 A1* | 1/2008 | Head | G06Q 30/00 705/14.1 |
| 2009/0281923 A1* | 11/2009 | Selinger | G06Q 30/02 705/26.1 |
| 2011/0093344 A1* | 4/2011 | Burke | G06Q 30/06 705/14.65 |
| 2013/0226729 A1* | 8/2013 | Reed | G06Q 30/0226 705/26.7 |
| 2014/0089088 A1* | 3/2014 | Umeda | G06Q 30/0255 705/14.53 |
| 2014/0310078 A1* | 10/2014 | Andriyanenko | G06Q 30/0207 705/14.27 |
| 2016/0125503 A1* | 5/2016 | Li | G06Q 30/0631 705/26.7 |
| 2016/0225029 A1* | 8/2016 | VanDeVelde | G06Q 30/0275 |
| 2017/0186068 A1 | 6/2017 | Dumouchel et al. | |
| 2018/0189794 A1* | 7/2018 | Campos | H04L 63/0815 |
| 2018/0197200 A1* | 7/2018 | Zoldi | G06Q 30/0255 |
| 2018/0336597 A1* | 11/2018 | Singh | G06Q 30/0224 |
| 2021/0065274 A1* | 3/2021 | Castinado | G06Q 30/0635 |

OTHER PUBLICATIONS

Extended European Search Report issued from corresponding European Application No. 20887620.1 dated Mar. 30, 2023 (10 pages).
Chen Gong et al: "In-Depth Survey of Digital Advertising Technologies", IEEE Communications Surveys & Tutorials, vol. 18, No. 3, Jan. 2016, pp. 2124-2148 (25 Pages).

* cited by examiner

PERSONALIZED PRODUCT SERVICE

CROSS-REFERENCE TO RELATED APPLICATIONS

This application claims priority under 35 U.S.C. § 121 as a divisional of U.S. patent application Ser. No. 17/098,142, entitled "PERSONALIZED PRODUCT SERVICE," filed Nov. 13, 2020, which claims the benefit of U.S. Provisional Patent Application No. 62/936,314, entitled "PERSONALIZED PRODUCT SERVICE," to Zubin SINGH, et al., filed on Nov. 15, 2019, the contents of which are hereby incorporated by reference in their entirety, for all purposes.

BACKGROUND

Field

The present disclosure generally relates to systems for providing personalized product recommendation lists to retailers to enable retailers to target products to consumers in various digital and physical channels with targeted product promotions, product marketing messages, product discounts, product rankings in digital circulars, and a variety of other marketing related use-cases. More specifically, embodiments as disclosed herein relate to providing personalized product lists to a retailer that are derived from combining previous purchasing history of the consumer with a variety of other data sources that are fed into data science models and algorithms that output a personalized list of recommendations for each consumer based on their retailer loyalty card number.

Description of the Related Art

Current retailer centric marketing programs rely on ad-hoc consumer databases owned by the retailers themselves, and therefore are not necessarily accurate, sufficiently updated, or simple to use. Also, retailers lack the skillset and tools to produce product level personalization targeted and tailored against each of their consumers that leads to wasted marketing dollars, inaccurate product level recommendations, fragmented consumer experiences, and the like. Accordingly, there is a desire to provide retailers with services and techniques to accurately recommend products to power their marketing and media targeting use-cases.

SUMMARY

In a first embodiment, a computer-implemented method includes receiving, in a server, a request from a service provider, the request including a consumer identification code associated with a consumer. The computer-implemented method also includes obtaining a personalized list of universal product codes based on the consumer identification code and a purchase history log in a database, providing the personalized list of universal product codes to the service provider; and receiving a tracking pixel indicative that the consumer has interacted with a consumer payload, wherein the consumer payload is associated with at least one product from the personalized list of universal product codes.

In a second embodiment, a system includes a memory circuit storing instructions and one or more processors configured to execute the instructions to cause the system to receive, in a server, a request from a service provider, the request including a consumer identification code. The one or more processors also execute instructions to obtain a personalized list of universal product codes based on the consumer identification code and a purchase history log in a database, and to provide the personalized list of universal product codes to the service provider.

In a third embodiment, a computer-implemented method includes parsing a purchase history of a consumer to verify a sufficient depth to provide a recommendation and evaluating the purchase history of the consumer based on a hierarchy of a universal product code provided by a retailer. The computer-implemented method also includes filtering out a product when a score of a product identified by the universal product code is less than a threshold, to form a list, scoring the product in the list based at least on one of a purchase probability of the product by the consumer, a value of the product, and a stock availability of the product identified by the universal product code at the retailer, and providing the list including the universal product codes sorted according to a score indicative of a purchase probability of the product identified by the universal product code.

In yet another embodiment, a non-transitory, computer-readable medium stores instructions which, when executed by a processor in a system, cause the system to receive, in a server, a request from a service provider, the request including a consumer identification code associated with a consumer, to obtain a personalized list of universal product codes based on the consumer identification code and a purchase history log in a database, and to provide the personalized list of universal product codes to the service provider. The processor also executes instructions to cause the system to receive a tracking pixel indicative that the consumer has interacted with a consumer payload, wherein the consumer payload is associated with at least one product from the personalized list of universal product codes.

In another embodiment, a system is disclosed that includes a first means for storing instructions, and a second means for executing the instructions to cause the system to perform a method. The method includes receiving, in a server, a request from a service provider, the request including a consumer identification code associated with a consumer. The method also includes obtaining a personalized list of universal product codes based on the consumer identification code and a purchase history log in a database, providing the personalized list of universal product codes to the service provider; and receiving a tracking pixel indicative that the consumer has interacted with a consumer payload, wherein the consumer payload is associated with at least one product from the personalized list of universal product codes.

In the figures, elements or steps having the same or similar labels are associated with features or processes having the same or similar description, unless otherwise stated.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

In some aspects, a server in embodiments as disclosed herein may host a vast personal identifiable information (PII) free consumer database containing loyalty card IDs linked with previous purchase transactions and other data sources and provide associated services to the consumers via one or more retailers. The server may include personalized information about the products and associated universal product codes (UPCs) carried at one or more retail stores. The server may include processors executing algorithms to return to a retailer a ranked list of the top UPCs for a given consumer, ranked according to a likelihood that a consumer associated with the consumer identification code will purchase the products. The retailer may then display the products, not limited to a digital advertising campaign to the consumer (e.g., via e-mail, instant messaging, or during multimedia downstream).

Solutions as disclosed herein are highly convenient for retailers to deliver personalized product recommendations to subscribers in their consumer loyalty network program or scheme. For example, the retailer may create digital advertising payloads highlighting the top products that consumers who are loyalty card holders of the retailer stores might find attractive and therefore lead to higher rates of purchase conversion for the retailer.

Example System Architecture

Figure 1:
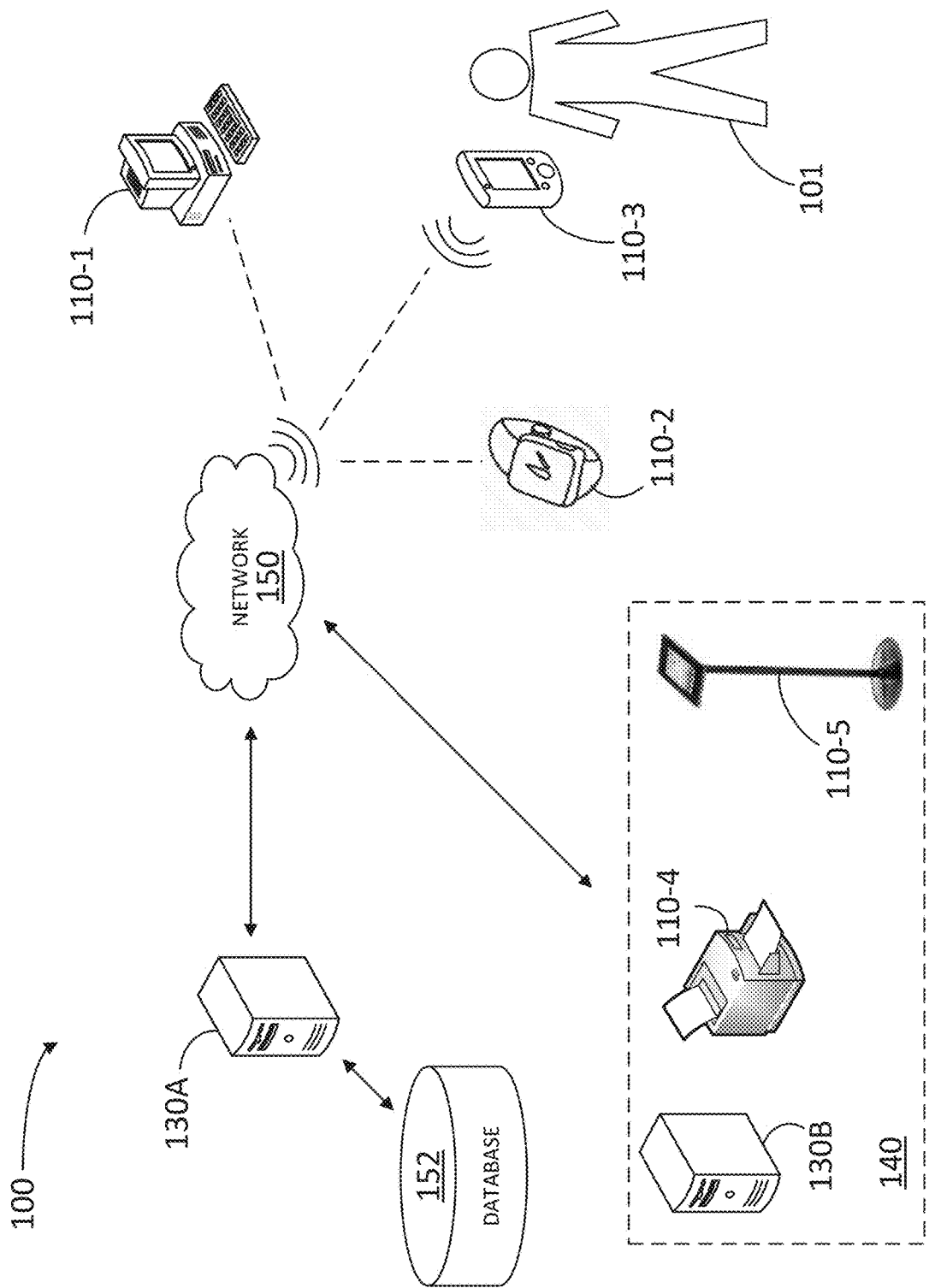
FIG. 1 illustrates an architecture of devices and systems for providing a personalized product service, according to some embodiments.

FIG. 1 illustrates an architecture 100 of devices and systems in a network 150 configured for providing personalized product recommendation lists to enable a retailer 140 to target products to a consumer 101, according to some embodiments. A server 130A may be coupled with a database 152 storing a purchase history log for each of multiple consumers 101. Database 152 may also include PII free consumer identification information or codes, such as frequent shopper cards (FSC) and the like. While the FSC identifies one consumer 101 from another, the data is de-personalized according to PII protocols, such as that the anonymity of consumer 101 and consumer households is preserved against any third party. Architecture 100 includes a first network server (server 130A) providing the product personalization-as-a-service through a private and secure API connection. In some embodiments, server 130A may include a supply side platform (SSP) server, configured to provide online media content to consumers (e.g., music, videos, movies, news and other broadcasts, podcasts, blogs, and the like). A second network server (server 130B), may be owned by a retailer 140 or a service provider for one or more retailers (e.g., grocery retailer, apparel, general store, and the like) to communicate with server 130A, e.g., an e-mail server provider (ESP), marketing and communications platform, and the like. For example, consumer 101 may use a client device 110-1, 110-2, or 110-3 to interface indirectly and receive personalized product recommendations on behalf of the retailer with the underlying marketing product personalization driven through communication from server 130B to server 130A (hereinafter, collectively referred to as "servers 130").

Retailer 140 may include server 130B and client devices 110-4 (e.g., a printer) and 110-5 (e.g., a standing pad or touchscreen) including various digital and physical channels with targeted product promotions, product marketing messages, product discounts, product rankings in digital circulars, and a variety of other marketing related use-cases. Client devices 110-1 through 110-5 will be collectively referred to, hereinafter, as "client devices 110."

Servers 130 may interact and communicate with other devices in network 150 via any one of multiple interfaces. The interfaces may include digital or physical channels by which the retailer communicates with the consumer. For example, some of the interfaces may include e-mail, mobile phone push notification services, text messaging, paper circular mailers, and the like. More specifically, servers 130 and client devices 110 may include an appropriate processor, memory, and communications capability, configured to interact with network 150 via a digital interface. Client devices 110 may include, for example, desktop computers, mobile computers, tablet computers (e.g., including e-book readers), a digital stand in a retailer store, mobile devices (e.g., a smartphone or PDA), wearable devices (e.g., smart watch and the like), or any other devices having appropriate processor, memory, and communications capabilities for accessing one or more of servers 130 through network 150. In some embodiments, client devices 110 may include a Bluetooth radio or any other radio-frequency (RF) device for wireless access to network 150. The memory in the client device from the retailer may include instructions from an application programming interface (API) hosted by server 130A (e.g., downloaded from, updated by, and in communication with server 130A). The API in client devices 110-4 or 110-5 may be configured to cause client devices 110-4 or 110-5 to execute steps consistent with methods disclosed herein.

Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

In some embodiments, server 130A is configured to receive a request from server 130B, the request including a consumer identification code, to obtain a personalized list of universal product codes based on the consumer identification code and residing purchase history log in a database (e.g., with accompanying data sets), and to return the personalized list of universal product codes to server 130B.

Figure 2:
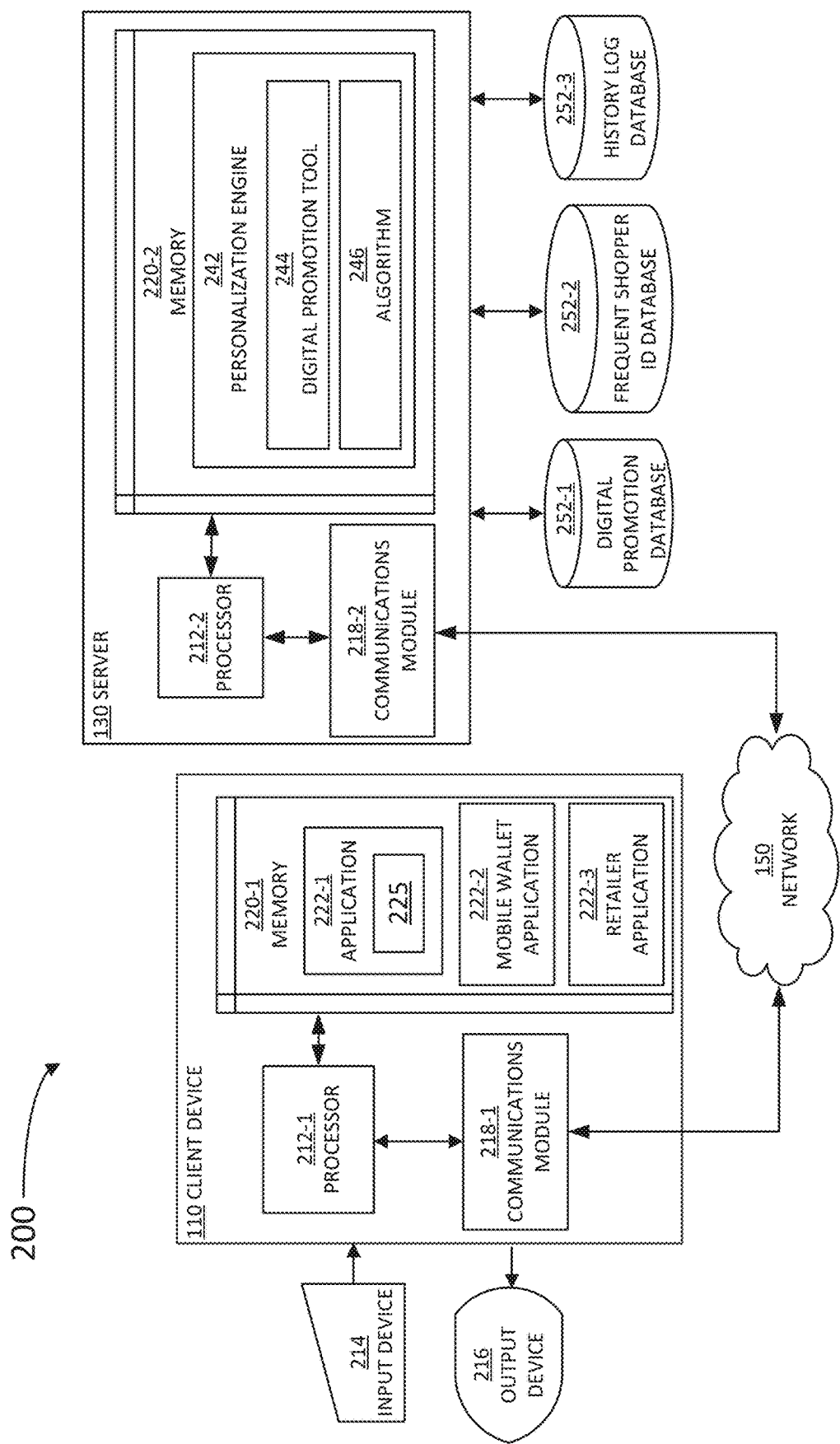
FIG. 2 illustrates the details for devices and systems in the architecture of FIG. 1, according to some embodiments.

FIG. 2 is a block diagram 200 illustrating an example server 130 and client device 110 in the architecture 100 of FIG. 1, according to certain aspects of the disclosure. Client device 110 and server 130 are communicatively coupled over network 150 via respective communications modules 218-1 and 218-2 (hereinafter, collectively referred to as "communications modules 218"). Communications modules 218 are configured to interface with network 150 to send and receive information, such as data, requests, responses, and commands to other devices on the network. Communications modules 218 can be, for example, modems or Ethernet cards. Client device 110 may be coupled with an input device 214 and with an output device 216. Input device 214 may include a keyboard, a mouse, a pointer, or even a touch-screen display that a consumer may use to interact with client device 110. Likewise, output device 216 may include a display and a speaker with which the consumer may retrieve results from client device 110. Client device 110 may also include a processor 212-1, configured to execute instructions stored in a memory 220-1, and to cause client device 110 to perform at least some of the steps in methods consistent with the present disclosure. Memory 220-1 may further include an application 222-1, including specific instructions which, when executed by processor 212-1, cause a digital promotion payload 225 hosted by server 130 to be displayed for the consumer. Digital promotion payload 225 may include multiple digital promotions or coupons presented to the consumer by server 130, and the consumer may store at least some of the digital promotions or coupons from digital promotion payload 225 in memory 220-1.

In some embodiments, memory 220-1 may include a mobile wallet application 222-2, configured to store a value offer (e.g., a coupon, a discount, and the like), which has been selected (e.g., "clipped") by the consumer from any one of the multiple digital promotions or coupons in digital promotion payload 225. Further, in some embodiments, mobile wallet application 222-2 may associate the value offer selected by the consumer to an FSC ID for the retailer stored in memory 220-1. Mobile wallet application 222-2 may be installed in memory 220-1 by the manufacturer, together with the installation of an operating system that controls all hardware operations of client device 110. Moreover, in some embodiments, a consumer may download a retailer application 222-3 in client device 110 from the retailer (e.g., server 130). The consumer may have an FSC ID associated with retailer application 222-3. In some embodiments, in addition to one or more "brick and mortar" physical locations of stores for the retailer, the retailer may host an online shopping outlet hosted by a network server (e.g., server 130). Application 222-1, mobile wallet application 222-2, and retailer application 222-3 will be collectively referred to, hereinafter, as "applications 222."

Server 130 includes a memory 220-2, a processor 212-2, and communications module 218-2. Processor 212-2 is configured to execute instructions, such as instructions physically coded into processor 212-2, instructions received from software in memory 220-2, or a combination of both. Memory 220-2 includes a personalization engine 242. In some embodiments, personalization engine 242 includes a digital promotion tool 244 for integrating images, videos, and other multimedia files stored in a digital promotion database 252-1 into a digital promotion payload 225. Digital promotion tool 244 may push digital promotions from digital promotion database 252-1 to a consumer of client device 110 that is a consumer of a retailer store or chain of stores through an application 222-1 or a web browser installed in client device 110. Accordingly, applications 222 may be installed by server 130 and perform scripts and other routines provided by server 130. In some embodiments, application 222-1 may be configured to display digital promotion payload 225 provided by digital promotion tool 244.

Digital promotion tool 244 integrates digital promotion payload 225 based on information retrieved from a frequent shopper identification database 252-2 and a history log database 252-3. History log database 252-3 includes the purchase history of multiple consumers listed in frequent shopper identification database 252-2. To achieve this, in some embodiments, an algorithm 246 stores commands which, when executed by processor 212-2, causes server 130 to integrate digital promotion payload 225. Algorithm 246 may include a neural network (NN) trained over frequent shopper identification database 252-2 and history log database 252-3, to select digital promotion payload 225 targeted to the specific preferences of a consumer when the consumer uses any one of applications 222 to access a network site hosted by server 130 (e.g., an SSP server). Accordingly, the SSP server hosting the network site accessed through application 222 may be different from a DSP server hosting digital promotion tool 244.

In some embodiments, personalization engine 242 may be configured to personalize a list of UPCs from an FSC code associated with a consumer and provided through a network server using a product hierarchy from retailer 140. Personalization engine 242 may execute a model that uses foundational personalization logic. Accordingly, personalization engine 242 may configure the API in a retailer client device 110 to return, upon request, a list of UPCs for a consumer selected by the retailer. In some embodiments, personalization engine 242 may configure the API in the retailer client device 110 to provide enhanced personalization and full product details, including additional shopper personalities to the model to enhance personalization of the UPC list. For example, in some embodiments, the API in retailer client device 110 may be integrated with other APIs from a retailer network to obtain the UPCs, pictures, and graphics of the products, product description, pricing, and the like, and to include one or more of the above in the API response.

In some embodiments, the API installed in the retailer client device is an exposed API that the retailer invokes using a preset and configured retailer Network ID and an FSC ID. The Network ID identifies the retailer as a client of the consumer network hosted by server 130. The FSC ID identifies a specific consumer that the retailer desires to address with a target advertisement in an advertisement campaign. The API will return a list of personalized UPCs (e.g., one or more, up to eight, ten, or even more, depending on settings determined by the retailer). Each item in the UPC list may include a UPC number, a tracking pixel, and the FSC ID. In some embodiments, there may be a pre-selected number of items in the UPC list provided (e.g., eight or more). Accordingly, the personalization engine in server 130A may be configured to pad the UPC list with a default set of UPCs in addition to at least one personalized UPC, to complete the pre-selected number of items.

The API response (provided to the retailer by server 130, upon request) includes a list of UPCs selected from a product hierarchy in the retailer. The product hierarchy may include a product classification according to a retailer preference (e.g., vegetables, packaged groceries, meats, grains, canned goods, bottled products, beverages, kitchen supplies, cleaning supplies, health products, pharmacy products, and the like). Each product in the retailer hierarchy or classification may have a UPC associated with it. The personalization engine in server 130 personalizes UPCs associated with the retailer, based on the FSC ID provided by the retailer through the API request. Accordingly, the personalization engine finds UPCs available in one or more of the retailer stores, that have a high likelihood of being purchased by the consumer associated with the FSC ID, based on a prior purchase history of the consumer. The API then returns the UPCs found by the personalization engine in server 130A to the retailer. The retailer could then use the UPC to look up and build creative pieces or use a third party to look up accompanying creative and product meta-data (e.g., graphics, price values, price reductions, offers, coupons, credits, redeemable values, and the like) in the advertisement payload to be delivered to the consumer via the consumer client device (e.g., through an e-mail, an instant message, an embedded message, or an advertisement embedded in a multimedia downstream). The advertisement may include pictures of the products in the UPC list, and a special offer to consumer 101, including a price cut, a coupon, an extra item, or a combination of the above. In some embodiments, the offer may be tailored to the specific consumer. In that regard, the personalized list of UPCs returned by the API from server 130 may include a recommendation to the retailer (e.g., retailer 140, cf. FIG. 1) indicating a "high/medium/low" quality of the consumer vis-à-vis the retailer, in terms of likelihood of purchase, or total, overall value purchase, purchasing trends, and the like.

In some embodiments, the tracking pixel provides a measurement capability to the advertising or marketing campaign. In some embodiments, the pixel includes a script that executes a call to the API upon detection of a selected event in the interaction between the consumer and the advertisement payload. The call indicates a time stamp, the FSC ID, the UPC associated with the advertisement, and the channel through which the consumer interacted with the advertisement (e.g., e-mail, network browser, third party API, and the like).

In some embodiments, the measurement may include test and control actions provided by personalization engine 242. In some embodiments, pixel data is concatenated with information provided by the API and accessible to server 130. Server 130 may then execute analytics instructions to parse the pixel data and conduct a measurement. In some embodiments, the pixel data is stored in the database and the analytics instructions query the database for the pixel data.

In some embodiments, an API request as disclosed herein may include the following instructions and inputs provided to personalization engine 242, to be executed by one or more processors in the server, as follows:

```
GET http://XX.YYY.ZZ.DDD:EEEE/ppaas/fsc/USA/<network_id>/<FSC_ID>
//ppaas = product-personalization-as-a-service
```

Wherein X, Y, Z, D, and E are any digits between 1 and 9.

In some embodiments, an API response as disclosed herein may include the following instructions and inputs provided from personalization engine 242 to be executed by one or more processors in the retailer client device, as follows:

```
[
{
"upc": "111111111111",
"trackingpx1":"http....",
},
{
"upc": "222222222222",
"trackingpx1":" http....",
},
]
```

In the response, a call to activate a tracking pixel is invoked by the end client to inform personalization engine 242 that a product exposure from the personalized product recommendation service has taken place. A sample tracking pixel structure may be as follows:

```
https ://collect.cmccdn.com/event?account=cmc&profile=main&v=1&ua=UA-[token]
&did=
[insert_FSC_id_macro]&sid=
[utc_time_stamp_partner_to_fill_in]&cm=ad&t=impression&upc=
[insert_offer_id_macro]&coid=
[insert_client_offer_id_macro]&cs=email&ea=view& event=ge_ad2email
did = The FSCID ... Extract this value out of the API request incoming call that hits
the system
sid = UTC timestamp is what the partner will fill in.
upc= upc
```

To create the API, personalization engine 242 may use information such as retailer name and network ID. For example, an ESP will send e-mails, messages, and other communications including the advertisement payload to consumers. In some embodiments, the media display in the advertisement payload is handled by the retailer, who may use their selected marketing platform that includes an ESP and a selected Demand Side Platform (DSP) to retrieve content and create the advertisement payload (e.g., via digital interface channels). As disclosed above, the retailer may use any of multiple interface channels to communicate with the consumer, such as a digital interface channel (e-mail, text messaging, and the like), or even physical interface channels (including regular mail, leaflets, bulletins and the like).

Further, the API may be subject to certain acceptance criteria by the retailer such as responding to requests under a pre-selected amount of time (e.g., X milliseconds). Another criterion for the API may be a pre-selected number of UPCs to include in the returned list (e.g., one or more, eight, ten, or even more), which may depend on the FSC ID. In some embodiments, at least one or more, or all of the JSON parameters in the API response reflect the associated metadata. In some embodiments, at least one or more, or all UPCs returned in the API response are personalized against the FSC ID (e.g., may be directly associated with the FSC ID). The tracking pixel fills in at least some, or all of the metadata filled in the API request.

In one or more implementations, digital promotion database 252-1 integrates digital promotion payloads including coupons and digital promotions for multiple products on sale by a retailer having one or more stores. A frequent shopper identification database 252-2 may include a list of frequent consumers of the retailer. The retailer may create, update, and maintain digital promotion database 252-1, frequent shopper identification database 252-2, and history log database 252-3. In that regard, digital promotion database 252-1, frequent shopper identification database 252-2, and history log database 252-3 (hereinafter, collectively referred to as "databases 252") may be hosted by the retailer, while the digital promotion tool 244 may be hosted by a DSP server or a dynamic creative rendering server. Accordingly, the DSP server may have access to one or more of databases 252 through business agreements with one or more retailers.

In certain aspects, processor 212-2 in server 130 hosted by a retailer is configured to determine data for history log database 252-3 by obtaining consumer purchasing data identifying the consumer via the frequent shopper identification used at multiple purchasing events in multiple locations, over a pre-selected span of time. In some embodiments, history log database 252-3 includes online purchasing history for the consumer through applications 222 or a network browser.

Figure 3:
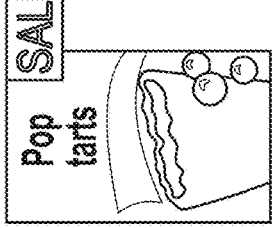
FIG. 3 illustrates a payload provided to the consumer by a retailer, according to some embodiments.

FIG. 3 illustrates a payload 300 provided to the consumer by a retailer server (e.g., server 130B), wherein the payload is created based on the personalized list of universal product codes provided to the retailer server by a personalization engine in a consumer network server (e.g., server 130A and personalization engine 242). Payload 300 may include graphic images 327-1, 327-2, 327-3, and 327-4 (hereinafter, collectively referred to as "images 327") of the products, and price reductions for the consumer. Payload 325 may include special offers to the consumer, including a price cut, a coupon, an extra item, or a combination of the above. In some embodiments, the client device receiving payload 300 may have a mobile wallet application installed and hosted by a consumer network server, and a retailer application hosted by the retailer server (e.g., server 130A, mobile wallet application 222-2, and retailer application 222-3). Accordingly, as the consumer scrolls through the different images 327, the consumer may activate an "add to cart" button 331, or an "add to my list" button 333. For example, button 331 may add the product in the selected image to a shopping cart, or a shopping list generated by the retailer application for the next time the consumer visits the retailer store. Likewise, button 333 may 'clip' an offer or coupon to the consumer wallet (e.g., at a specific retailer store), so that the consumer gets a discount, extra cash, or other offer, automatically during the purchase of the selected product or item.

Figure 4:
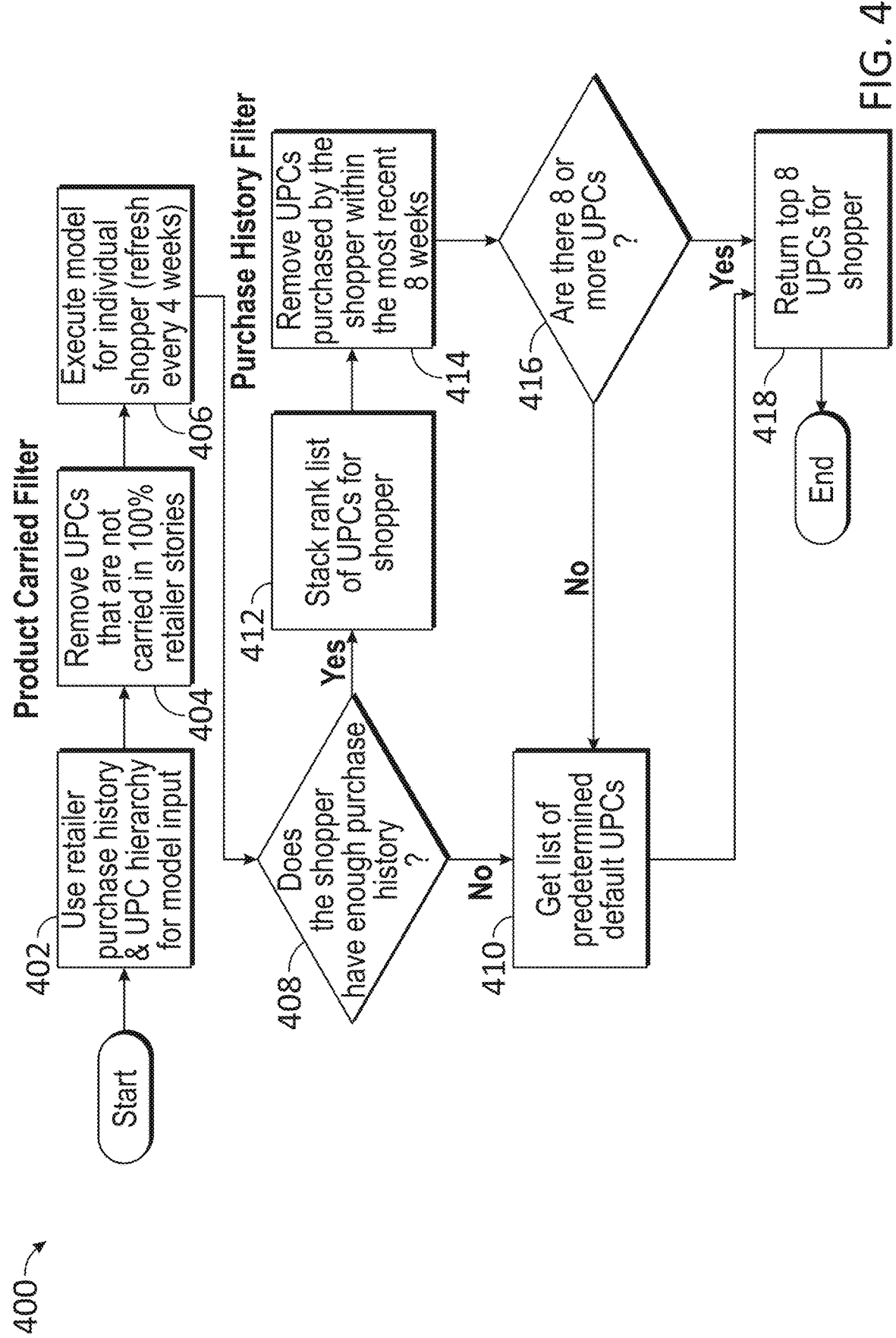
FIG. 4 illustrates steps in a method for providing a personalized product recommendation list to retailers for remotely accessing consumers, according to some embodiments.

FIG. 4 illustrates steps in a method 400 for providing personalized product recommendation lists to retailers for remotely accessing consumers. In method 400, a retailer desires to make product recommendations to one or more customers (e.g., for an e-mail campaign, cf. retailer 140 and server 130B). The recommendation lists are provided by a consumer network service provider (e.g., server 130A), based on personalizing products using the UPC hierarchy and classification from the retailer. The advertisement payload from the retailer (e.g., through e-mail) may include promotions and sale items related to that shoppers store. The advertisement payload may also include a section titled 'Products Recommended for You,' which will be powered by a personalization engine in the consumer network service provider (e.g., personalization engine 242).

In some embodiments, one or more of the steps in method 400 may be performed by a consumer network database server communicatively coupled, via a network, with a retailer client device and with a consumer client device (cf. servers 130, client devices 110, and network 150). Further, one or more of the steps in method 400 may be performed by an ESP server, a DSP server, an SSP server (e.g., server 130A) coupled to the network, and the retailer client device (e.g., server 130B). Each one of the servers in method 400 may be coupled with a consumer network database to store in, and retrieve data from (cf. databases 152 or 252). Moreover, in some embodiments, methods consistent with the present disclosure may include at least one of the steps in method 400 performed in a different order, simultaneously, quasi-simultaneously, or overlapping in time.

Step 402 includes sorting a purchase history stored in the consumer network database for a consumer identified with an FSC ID and a UPC hierarchy, and classification of retailer products to form a first UPC list.

Step 404 includes removing from the UPC list, UPC values associated with products that are not carried by a selected number of retail stores (e.g., all retail stores). In some embodiments, step 404 includes using a retailer hierarchy or classification for UPCs based on the products carried at the retail stores. In some embodiments, step 404 includes limiting the scope of UPCs available for personalization to include UPCs carried in 100% of the retailer stores.

Step 406 includes executing a model stored in the personalization engine, to sort the UPC list according to a likelihood of purchase by the consumer. In some embodiments, step 406 may include executing the personalization engine for the same consumer and the same retailer, at a selected frequency, incorporating new data in the consumer network database.

Step 408 includes determining whether the consumer has a sufficiently long purchase history in the consumer network database. When the consumer does not have a sufficiently long purchase history according to step 408, step 410 includes getting a list of pre-determined default UPCs. Accordingly, in some embodiments, step 410 includes padding the UPC list up to a pre-selected quota (e.g., eight UPCs and the like). When the consumer has a sufficiently long purchase history according to step 408, step 412 includes stacking the list of UPCs for the consumer, sorted (e.g., ranked) according to a likelihood of purchase by the consumer. In some embodiments, step 412 includes evaluating all of the retailer UPCs, and assigning each UPC a Consumer Relevancy Score (CRS), then putting the UPC in rank order for each consumer (#1 to #X). In some embodiments, step 412 includes selecting (by the consumer network server, or by the retailer) the number of ranked products.

Step 414 includes removing, from the UPC list, the UPCs that have been purchased by the consumer within a selected, most recent period of time (e.g., within the last eight weeks and the like).

Step 416 includes determining whether after step 414 there are still enough UPC s in the UPC list to satisfy the pre-selected quota.

When there are more UPCs in the UPC list than the quota after step 414, according to step 416, step 418 includes returning the UPC list including at least as many UPCs as in the pre-selected quota. In some embodiments, step 416 includes building an advertisement payload, and transmitting the advertisement payload to the consumer during an advertisement campaign (e.g., approximately 500,000-1,000,000 e-mails go out per campaign weekly or monthly). In some embodiments, step 418 includes integrating a retailer API and an ESP API with the UPC list to retrieve an advertisement component, an offer title, and an offer save line and price data elements (by the consumer network server or by the retailer client device or another retail server). In some embodiments, step 418 includes querying retailer APIs to retrieve data elements associated with each UPC to build the content of the advertisement payload.

When there are fewer UPCs in the UPC list than the quota after step 414, according to step 416, the method is repeated from step 410.

Figure 5:
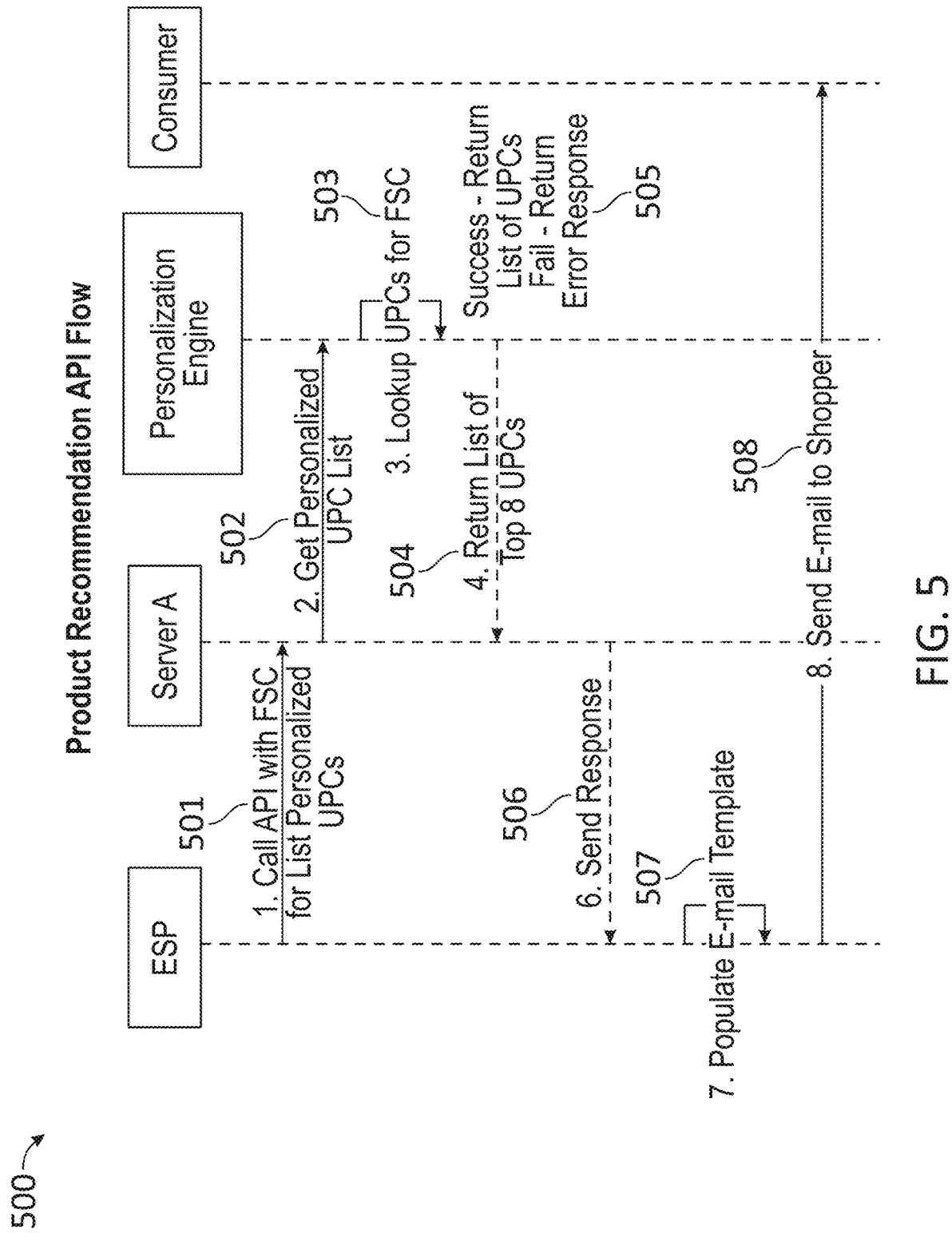
FIG. 5 illustrates a block diagram indicating devices and systems executing steps in a method for providing personalized product recommendation lists to retailers for remotely accessing consumers, according to some embodiments.

FIG. 5 illustrates a block diagram indicating devices and systems executing steps in a method 500 for providing personalized product recommendation lists to retailers for remotely accessing consumers, according to some embodiments. In some embodiments, one or more of the steps in method 500 may be performed by a consumer network database server communicatively coupled, via a network, with a retailer client device and with a consumer client device (cf. servers 130, client devices 110, and network 150). Further, one or more of the steps in method 500 may be performed by an ESP server, a DSP server, an SSP server (e.g., server 130A) coupled to the network, and the retailer client device (e.g., server 130B). Each one of the servers in method 500 may be coupled with a consumer network database to store in, and retrieve data from (cf. databases 152 or 252). Moreover, in some embodiments, methods consistent with the present disclosure may include at least one of the steps in method 500 performed in a different order, simultaneously, quasi-simultaneously, or overlapping in time.

Step 501 includes calling, from the ESP server, an API hosted by server A. The call includes an FSC ID to request a list of personalized UPCs from server A. In some embodiments, the API is an exposed API that a retailer can call from a client device, using a Network ID and the FSC ID as input.

Step 502 includes requesting, from server A, a personalized UPC list from the personalization engine.

Step 503 includes looking up and creating a sorted UPC list based on the FSC ID.

Step 504 includes returning the personalized UPC list to server A when a quota is satisfied (e.g., eight UPCs and the like).

Step 505 includes returning an error message to server A when the list cannot be obtained, or the quota is not satisfied.

Step 506 includes sending a response to the ESP via the API. In some embodiments, step 506 includes inserting a tracking pixel in the response, upon explicit authorization by the retailer and/or the consumer.

Step 507 includes populating, at the ESP, an advertisement payload (e.g., an e-mail message).

Step 508 includes sending the advertisement payload to the consumer.

Figure 6:
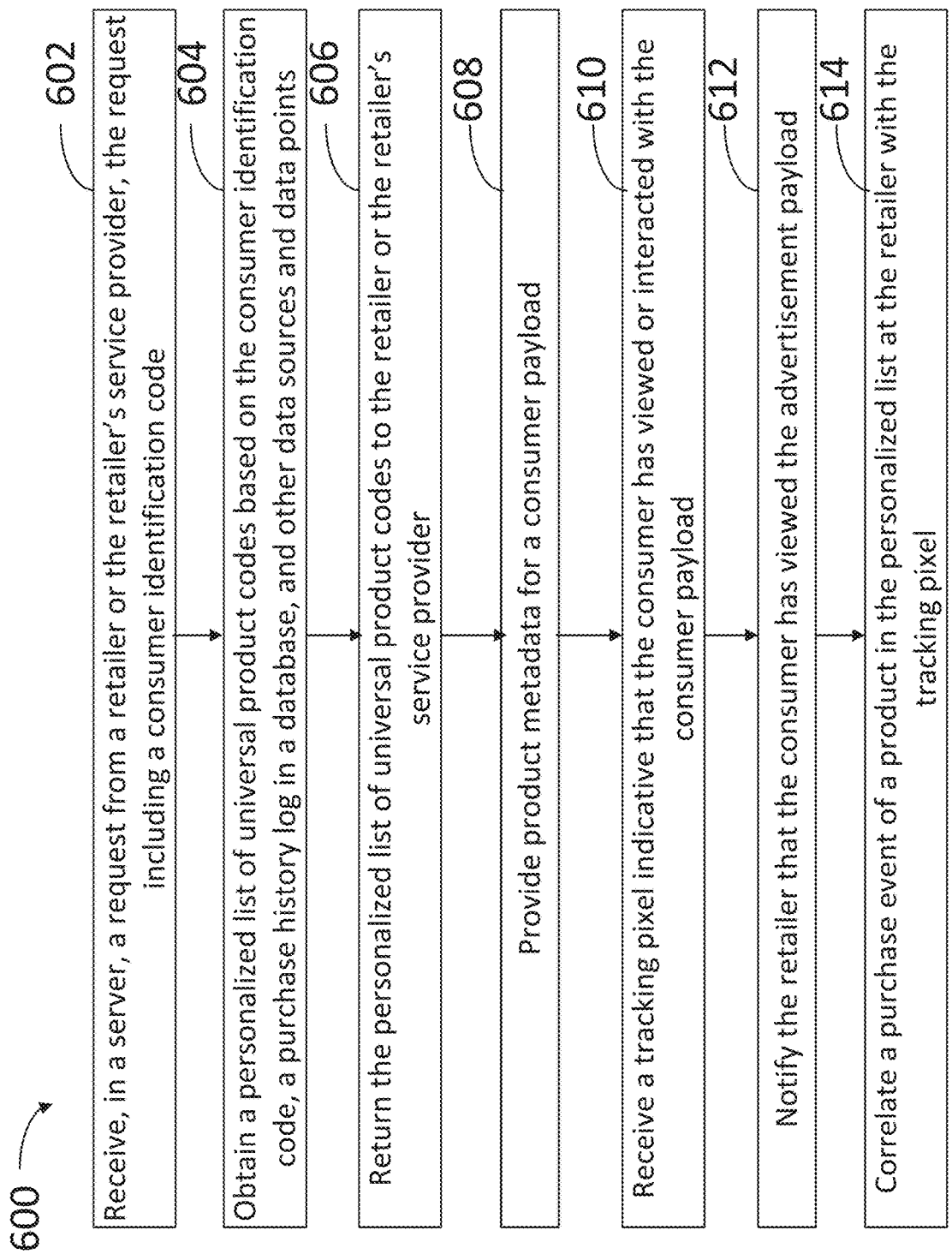
FIG. 6 illustrates steps in a method for in-store printing of personalized, added value certificates, according to some embodiments.

FIG. 6 illustrates steps in a method 600 for in-store printing of personalized, added value certificates, according to some embodiments. In some embodiments, one or more of the steps in method 600 may be performed by a consumer network database server communicatively coupled, via a network, with a retailer client device and with a consumer client device (cf. servers 130, client devices 110, and network 150). Further, one or more of the steps in method 600 may be performed by an ESP server, a DSP server, an SSP server (e.g., server 130A) coupled to the network and the retailer client device (e.g., server 130B). Each one of the servers in method 600 may be coupled with a consumer network database to store in, and retrieve data from (cf. databases 152 or 252). Moreover, in some embodiments, methods consistent with the present disclosure may include at least one of the steps in method 600 performed in a different order, simultaneously, quasi-simultaneously, or overlapping in time.

Step 602 includes receiving, in a server, a request from the retailer or the retailer's service provider, the request including a consumer identification code. In some embodiments, step 602 includes receiving the request from an application programming interface hosted by the server, and returning the personalized list of universal product codes to the service provider includes returning the personalized list of universal product codes through the application programming interface within a pre-selected time period after receiving the request from the service provider.

Step 604 includes obtaining a personalized product list of UPCs based on the consumer identification code and a purchase history log in a database. In some embodiments, the list of personalized products not only involves the purchase log or history, but includes other data sources or data points. For example, other sources may include information provided by, or collected from, a different search engine that the consumer may subscribe or have access to, indicative of different needs or desires of the consumer in related areas, topics, or products. In some embodiments, step 504 includes sorting the personalized list of universal product codes based on a likelihood of product purchased by a consumer identified with the consumer identification code at a retail store serviced by the service provider. In some embodiments, step 604 includes selecting multiple products based on a time interval cutoff from the purchase history log in the database. In some embodiments, step 604 includes padding the personalized list of universal product codes with a default universal product code when the purchase history log is exhausted before completing a pre-selected quota. In some embodiments, step 604 includes selecting universal product codes associated with products that are for sale at a retail store serviced by the service provider. In some embodiments, step 604 includes training a non-linear algorithm for classifying the consumer identification code based on the purchase history log, and identifying a likelihood that a consumer associated with the consumer identification code, will purchase a product in the personalized list of universal product codes.

Step 606 includes returning the personalized list of UPCs to the retailer or to the service provider. In some embodiments, step 606 includes providing an ordered list of UPCs, ranked according to consumer preference, or purchase value (e.g., a factor including the price of the product and the likelihood of purchase by the consumer). In some embodiments, step 606 includes integrating the personalized list of universal product codes with an application programming interface hosted by the retailer or the retailer's service provider and returning a product picture, a product description, or a product pricing with the personalized list of universal product codes. In some embodiments, step 606 includes requesting, to the service provider, a data element associated with at least one product in the list of personalized universal product codes, and editing an advertisement for a consumer identified by the consumer identification code based on the data element. In some embodiments, step 606 includes returning to the service provider an instruction to be included in an advertisement for a consumer identified by the consumer identification code, the instruction configured to provide a measurement data to the service provider based on a consumer interaction with the advertisement.

Step 608 includes providing a product metadata for a consumer payload. In some embodiments, step 608 includes selecting the product metadata according to a channel for transmitting the consumer payload to the consumer. In some embodiments, the channel for transmitting the consumer payload to a client device with the consumer may include a web-based channel (e.g., via a web browser application), a mobile advertisement channel, a desktop advertisement channel, a home leaflet, and an e-mail. In some embodiments, step 608 includes providing the product metadata based on the exposure of a series of products handled by a consumer network server. In some embodiments, step 608 is powered by the retailer through a provider or publisher server (e.g., an ESP, DSP, or SSP server).

Step 610 includes receiving a tracking pixel indicative that the consumer has viewed or interacted with the consumer payload. The tracking pixel is embedded in the consumer payload and is configured to fire or trigger whenever the consumer is exposed to the payload (e.g., the consumer clicks an advertisement, or plays a video including the advertisement, and the like).

Step 612 includes notifying the retailer that the consumer has viewed the advertisement payload.

Step 614 includes correlating a purchase event of a product in the personalized list at the retailer with the trigger of a tracking pixel in the consumer payload.

Figure 7:
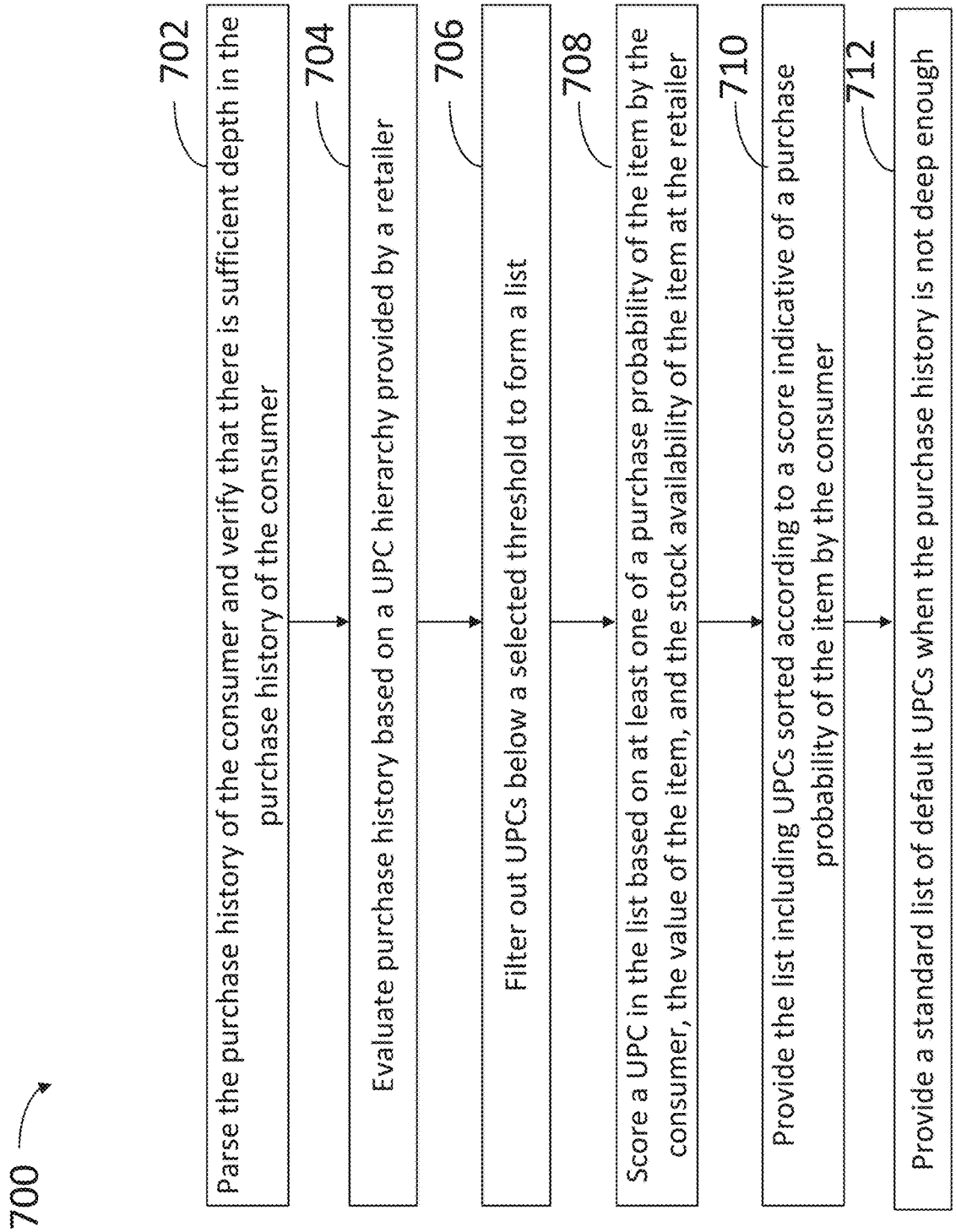
FIG. 7 illustrates steps in a method for providing a personalized product list to a remote server upon request, according to some embodiments.

FIG. 7 illustrates steps in a method 700 for providing a personalized product list to a remote server upon request, according to some embodiments. In some embodiments, one or more of the steps in method 700 may be performed by a consumer network database server communicatively coupled, via a network, with a retailer client device and with a consumer client device (cf. servers 130, client devices 110, and network 150). Further, one or more of the steps in method 700 may be performed by an ESP server, a DSP server, an SSP server (e.g., server 130A) coupled to the network, and the retailer client device (e.g., server 130B). Each one of the servers in method 700 may be coupled with a consumer network database to store in, and retrieve data from (cf. databases 152 or 252). Moreover, in some embodiments, methods consistent with the present disclosure may include at least one of the steps in method 700 performed in a different order, simultaneously, quasi-simultaneously, or overlapping in time.

Step 702 includes parsing the purchase history of the consumer and verifying that there is sufficient depth in the purchase history of the consumer to provide a useful recommendation.

Step 704 includes evaluating the purchase history based on a UPC product hierarchy.

Step 706 includes filtering out UPCs below a selected threshold. In some embodiments, step 706 includes filtering out UPCs from the purchase history that appear less than the threshold number of times in the purchase history. In some embodiments, step 706 includes filtering out UPCs from the purchase history that are carried by less than the threshold number of stores in a given retailer.

Step 708 includes scoring a UPC in the list based on at least one of a purchase probability of the item by the consumer, the value of the item, and the stock availability of the item at the retailer. In some embodiments, step 708 includes scoring the UPC in the list based on a geographic location of the consumer and a geographic location of a "nearest" (or sufficiently near) retailer store carrying the UPC item. Accordingly, when there is a retailer store that has a given product from the purchase history of a consumer, the UPC for this product may be given a higher value score.

Step 710 includes providing a list including UPCs sorted according to a score indicative of a purchase probability of the item by the consumer.

Step 712 includes providing a standard list of default UPCs when the purchase history is not deep enough.

Figure 8:
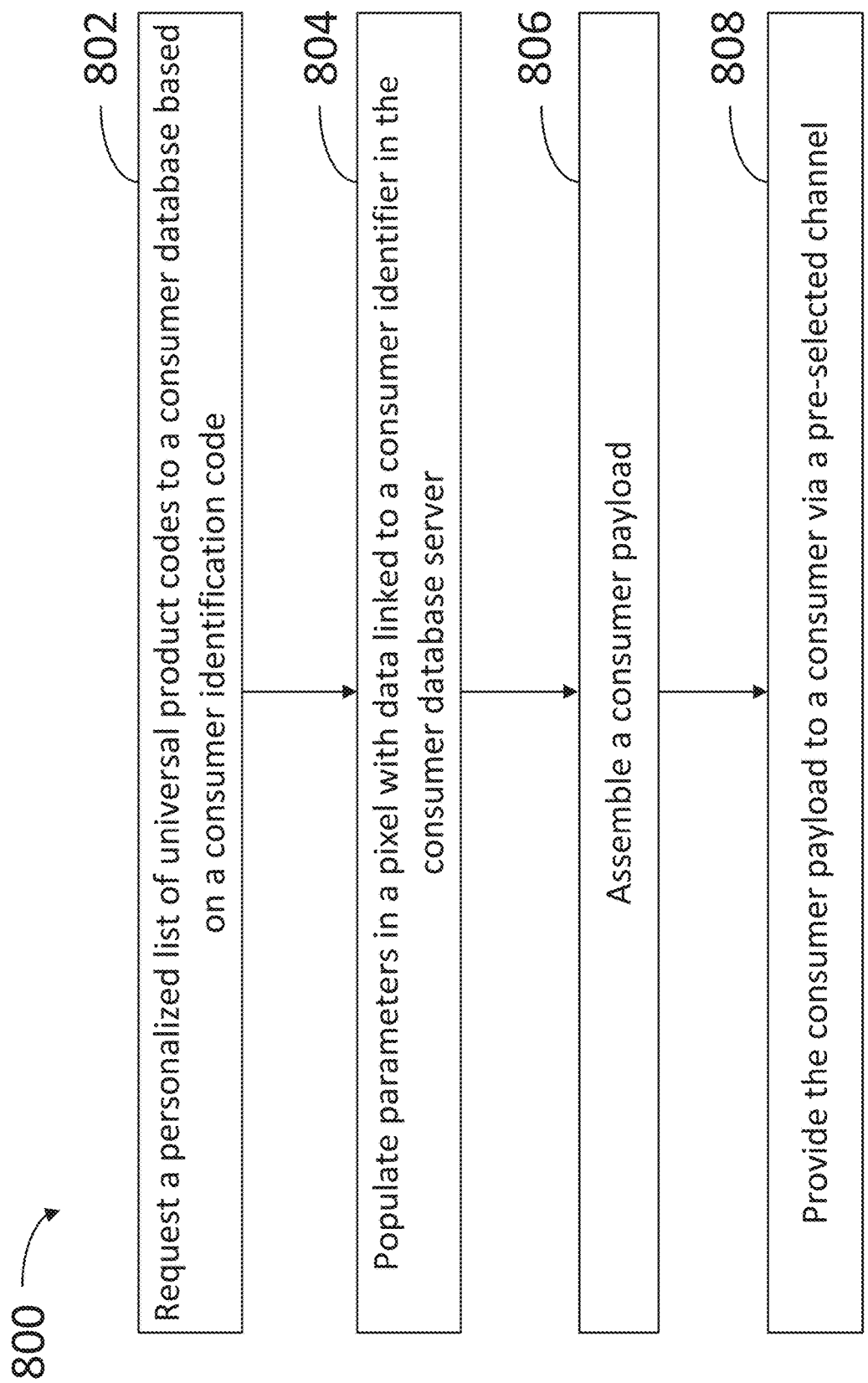
FIG. 8 illustrates steps in a method for providing a personalized payload to a consumer via a remote channel, according to some embodiments.

FIG. 8 illustrates steps in a method 800 for providing a personalized payload to a consumer via a remote channel, according to some embodiments. In some embodiments, one or more of the steps in method 800 may be performed by a consumer network database server communicatively coupled, via a network, with a retailer client device and with a consumer client device (cf. servers 130, client devices 110, and network 150). Further, one or more of the steps in method 800 may be performed by an ESP server, a DSP server, an SSP server (e.g., server 130A) coupled to the network, and the retailer client device (e.g., server 130B). Each one of the servers in method 800 may be coupled with a consumer network database to store in, and retrieve data from (cf. databases 152 or 252). Moreover, in some embodiments, methods consistent with the present disclosure may include at least one of the steps in method 800 performed in a different order, simultaneously, quasi-simultaneously, or overlapping in time.

Step 802 includes requesting a personalized list of universal product codes to a consumer database based on a consumer identification code.

Step 804 includes populating parameters in the pixel with data linked to a consumer identifier in the consumer database server.

Step 806 includes assembling a consumer payload.

Step 808 includes providing the consumer payload to a consumer via a pre-selected channel.

Hardware Overview

Figure 9:
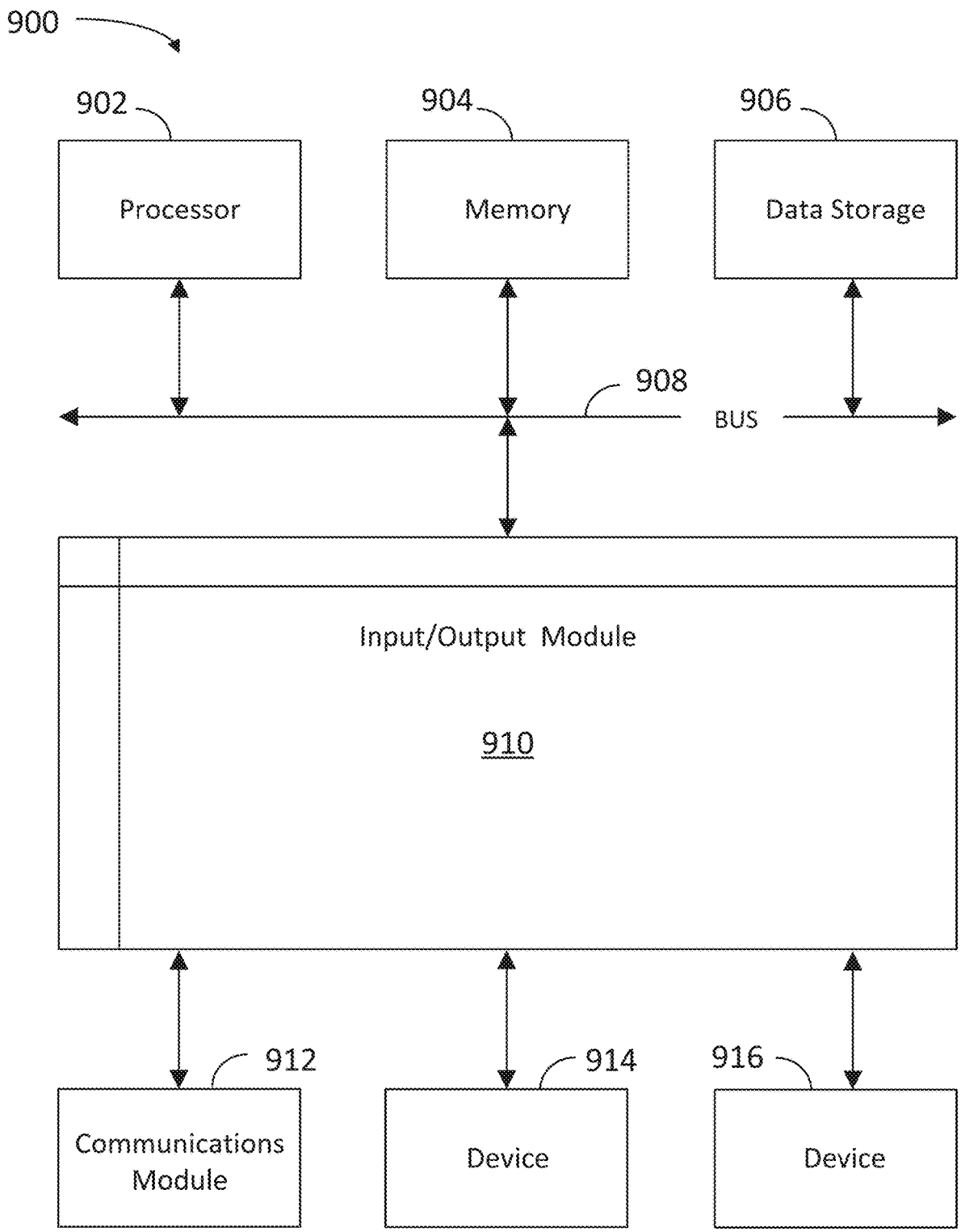
FIG. 9 is a block diagram illustrating an example computer system with which the client and server of FIGS. 1 and 2 and the methods of FIGS. 4 through 8 can be implemented.

FIG. 9 is a block diagram illustrating an exemplary computer system 900 with which the client device 110 and server 130 of FIGS. 1 and 2, and the methods of FIGS. 4 through 8 can be implemented. In certain aspects, the computer system 900 may be implemented using hardware or a combination of software and hardware, either in a dedicated server, or integrated into another entity, or distributed across multiple entities.

Computer system 900 (e.g., client device 110 and server 130) includes a bus 908 or other communication mechanism for communicating information, and a processor 902 (e.g., processors 212) coupled with bus 908 for processing information. By way of example, the computer system 900 may be implemented with one or more processors 902. Processor 902 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 900 can include, in addition to hardware, code that creates an execution environment for the computer program in question, e.g., code that constitutes processor firmware, a protocol stack, a database management system, an operating system, or a combination of one or more of them stored in an included memory 904 (e.g., memories 220), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled with bus 908 for storing information and instructions to be executed by processor 902. The processor 902 and the memory 904 can be supplemented by, or incorporated in, special purpose logic circuitry.

The instructions may be stored in the memory 904 and implemented in one or more computer program products, e.g., one or more modules of computer program instructions encoded on a computer-readable medium for execution by, or to control the operation of, the computer system 900, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 904 may also be used for storing temporary variable or other intermediate information during execution of instructions to be executed by processor 902.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and intercoupled by a communication network. The processes and logic flows described in this specification can be performed by one or more programmable processors executing one or more computer programs to perform functions by operating on input data and generating output.

Computer system 900 further includes a data storage device 906 such as a magnetic disk or optical disk, coupled with bus 908 for storing information and instructions. Computer system 900 may be coupled via input/output module 910 to various devices. Input/output module 910 can be any input/output module. Exemplary input/output modules 910 include data ports such as USB ports. The input/output module 910 is configured to connect to a communications module 912. Exemplary communications modules 912 (e.g., communications modules 218) include networking interface cards, such as Ethernet cards and modems. In certain aspects, input/output module 910 is configured to connect to a plurality of devices, such as an input device 914 (e.g., input device 214) and/or an output device 916 (e.g., output device 216). Exemplary input devices 914 include a keyboard and a pointing device, e.g., a mouse or a trackball, by which a consumer can provide input to the computer system 900. Other kinds of input devices 914 can be used to provide for interaction with a consumer as well, such as a tactile input device, visual input device, audio input device, or brain-computer interface device. For example, feedback provided to the consumer can be any form of sensory feedback, e.g., visual feedback, auditory feedback, or tactile feedback; and input from the consumer can be received in any form, including acoustic, speech, tactile, or brain wave input. Exemplary output devices 916 include display devices, such as an LCD (liquid crystal display) monitor, for displaying information to the consumer.

According to one aspect of the present disclosure, the client device 110 and server 130 can be implemented using a computer system 900 in response to processor 902 executing one or more sequences of one or more instructions contained in memory 904. Such instructions may be read into memory 904 from another machine-readable medium, such as data storage device 906. Execution of the sequences of instructions contained in main memory 904 causes processor 902 to perform the process steps described herein. One or more processors in a multi-processing arrangement may also be employed to execute the sequences of instructions contained in memory 904. In alternative aspects, hard-wired circuitry may be used in place of or in combination with software instructions to implement various aspects of the present disclosure. Thus, aspects of the present disclosure are not limited to any specific combination of hardware circuitry and software.

The subject technology is illustrated, for example, according to various aspects described below. Various examples of aspects of the subject technology are described as numbered claims (claim 1, 2, etc.) for convenience. These are provided as examples, and do not limit the subject technology.

In one aspect, a method may be an operation, an instruction, or a function and vice versa. In one aspect, a clause may be amended to include some or all of the words (e.g., instructions, operations, functions, or components) recited in other one or more clauses, one or more words, one or more sentences, one or more phrases, one or more paragraphs, and/or one or more clauses.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be described, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described as such, one or more features from a described combination can in some cases be excised from the combination, and the described combination may be directed to a subcombination or variation of a subcombination.

The subject matter of this specification has been described in terms of particular aspects, but other aspects can be implemented and are within the scope of the following clauses. For example, while operations are depicted in the drawings in a particular order, this should not be understood as requiring that such operations be performed in the particular order shown or in sequential order, or that all illustrated operations be performed, to achieve desirable results. The actions recited in the clauses can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the clauses. In addition, in the detailed description, it can be seen that the description provides illustrative examples and the various features are grouped together in various implementations for the purpose of streamlining the disclosure. The method of disclosure is not to be interpreted as reflecting an intention that the described subject matter requires more features than are expressly recited in each clause. Rather, as the clauses reflect, inventive subject matter lies in less than all features of a single disclosed configuration or operation. The clauses are hereby incorporated into the detailed description, with each clause standing on its own as a separately described subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method, comprising:
parsing a purchase history of a consumer to verify a sufficient depth to provide a recommendation;
evaluating the purchase history of the consumer based on a hierarchy of a universal product code provided by a retailer;
filtering out a product when a score of a product identified by the universal product code is less than a threshold, to form a product list;
scoring the product in the product list based at least on one of a purchase probability of the product by the consumer, a value of the product, and a stock availability of the product identified by the universal product code at the retailer;

padding the product list with a default universal product code when the purchase history is exhausted before completing a pre-selected quota;

providing the product list including the universal product codes sorted according to a score to a remote server for assembling a digital payload for a consumer;

assembling the digital payload including media files associated with each of the products in the product list;

providing the digital payload to the consumer;

receiving a tracking pixel indicative that the consumer has interacted with the digital payload; and notifying, in response to the tracking pixel, a retailer that the consumer has interacted with the digital payload in response to a tracking pixel triggered by a client device with the consumer upon downloading the digital payload.

2. The computer-implemented method of claim 1, further comprising providing a standard list of default universal product codes when the purchase history is not deep enough.

3. The computer-implemented method of claim 1, further comprising selecting the threshold as a percentage number of retailer stores that have the product identified by the universal product code in stock.

4. The computer-implemented method of claim 1, further comprising selecting the threshold as a percentage number of times the product identified by the universal product code appears in the purchase history of the consumer.

5. The computer-implemented method of claim 1, wherein scoring the universal product code comprises weighting the score positively when a geolocation of the consumer overlaps with a geolocation of a retailer store having the product identified by the universal product code in stock.

6. The computer-implemented method of claim 1, further comprising receiving, from the remote server, a request from a service provider, the request including an identification code associated with the consumer.

7. The computer-implemented method of claim 1, wherein to form a product list comprises selecting a personalized list of universal product codes based on a consumer identification code and a purchase history log in a database.

8. The computer-implemented method of claim 1, further comprising receiving, from the remote server, a tracking pixel indicative that the consumer has interacted with the digital payload.

9. The computer-implemented method of claim 1, wherein filtering out a product to form a list comprises filtering out the product based on a time interval cutoff from the purchase history of the consumer in a database.

10. The computer-implemented method of claim 1, wherein to form a list comprises selecting universal product codes associated with products that are for sale at a retail store serviced by the remote server.

11. A system, comprising:
one or more processors; and
a memory storing instructions which, when executed by the one or more processors, cause the system to:
parse a purchase history of a consumer to verify a sufficient depth to provide a recommendation;
evaluate the purchase history of the consumer based on a hierarchy of a universal product code provided by a retailer;
filter out a product when a score of a product identified by the universal product code is less than a threshold, to form a list;
score the product in the list based at least on one of a purchase probability of the product by the consumer, a value of the product, and a stock availability of the product identified by the universal product code at the retailer;
provide the list including the universal product codes sorted according to a score to a remote server for assembling a digital payload for a consumer;
assemble the digital payload including media files associated with each of the products in the list;
provide the digital payload to the consumer;
receive a tracking pixel indicative that the consumer has interacted with the digital payload; and
notify a retailer that the consumer has interacted with the digital payload in response to a tracking pixel triggered by a client device with the consumer upon downloading the digital payload.

12. The system of claim 11, wherein the one or more processors further execute instructions to provide a standard list of default universal product codes when the purchase history is not deep enough.

13. The system of claim 11, wherein the one or more processors further execute instructions to select the threshold as a percentage number of retailer stores that have the product identified by the universal product code in stock.

14. The system of claim 11, wherein to form the list, the one or more processors execute instructions to select multiple products based on a time interval cutoff from the purchase history of the consumer in a database.

15. The system of claim 11, wherein to score the universal product code the one or more processors execute instructions to weight the score positively when a geolocation of the consumer overlaps with a geolocation of a retailer store having the product identified by the universal product code in stock.

16. The system of claim 11, wherein to form the list, the one or more processors execute instructions to select a universal product code associated with a products that is for sale at a retail store serviced by the remote server.

17. The system of claim 11, wherein to form the list, the one or more processors execute instructions to train a non-linear algorithm for classifying a consumer identification code based on the purchase history of the consumer, and to identify a likelihood that a consumer associated with the consumer identification code, will purchase a product in the list.

18. The system of claim 11, wherein to form the list, the one or more processors execute instructions to integrate the list with an application programming interface hosted by the remote server and to provide a product picture, a product description, or a product pricing with the list.

19. The system of claim 11, wherein the one or more processors further execute instructions to request, to the remote server, a data element associated with at least one product in the list, and to edit an advertisement for the consumer based on the data element.

20. The system of claim 11, wherein the one or more processors further execute instructions to provide a measurement data to the remote server based on a consumer interaction with the digital payload.

* * * * *